United States Patent Office 3,808,334
Patented Apr. 30, 1974

3,808,334
COMBATING APHIDS WITH BENZOTRIAZOLE-
CARBOXAMIDES
Norman A. Dahle, Mission, Kans., assignor to Gulf
Research & Development Company, Pittsburgh, Pa.
No Drawing. Filed Dec. 18, 1970, Ser. No. 99,695
Int. Cl. A01n 9/22
U.S. Cl. 424—269                                    2 Claims

ABSTRACT OF THE DISCLOSURE

Plant insect pests, particularly aphids, are combated by applying to the locus of the plants an effective but substantially nonphytotoxic amount of a product of reaction of dimethylcarbamyl chloride under basic conditions with benzotriazole, 5-methylbenzotriazole or 5,6-dimethylbenzotriazole. The reaction products are mixtures of varying proportions of isomeric benzotriazole dimethylcarboxamides which are difficult to separate by chemical or physical techniques.

DESCRIPTION OF INVENTION

I have discovered that aphids may be combated by applying to the locus of infested plants an effective amount of a benzotriazole-dimethylcarboxamide product. These products are obtained by reaction under basic conditions and generally consist of isomeric substances which are difficult to separate by conventional methods. Although there is some variation in effectiveness of different isomers, separation is not necessary for use in combating aphids. The use of these reaction products to combat aphids is particularly advantageous because they are relatively harmless to many other insects and do not produce indiscriminate broad spectrum kills of insects and spiders. By avoiding the killing of competing and predatory organisms, a disastrous resurgence of aphid populations is rendered less probable.

The manner of preparation and the nature of the aphicides are discussed below.

SYNTHESIS OF THE APHICIDES

A. Benzotriazole-dimethylcarbamyl chloride reaction product

Treatment of a pyridine solution of benzotriazole with dimethylcarbamyl chloride at room temperature of ca. 23 hrs. affords upon distillation, a distillate product whose infrared spectrum exhibits a doublet in the carbonyl region. The nmr. spectrum of this material shows a single sharp peak and a broad hump in the N-methyl region and a complex multiplet in the aromatic region. The ratio of the sharp peak to the hump peak varies with the reaction conditions (i.e. time and temperature) used to prepare the product being investigated; however, the ratio of combined areas of the hump and the sharp single peak to that of aromatic protons always approaches 3:2. One would anticipate this ratio for a 1:1 combination of benbotriazole and dimethylcarbamyl chloride. Combustion elemental analyses also are consistent with a 1:1 combination of the reactants.

Fractional crystallization of the distillate yields a solid compound in 30% yield. The infrared spectrum of this compound shows but a single peak in the carbonyl region. The nmr. spectrum contains but one sharp peak in the N-methyl region and a complex multiplet in the aromatic region with a ratio of 3 methyl protons to 2 aromatic protons. The two possible structures which can be drawn for this solid are either the 1H derivative N,N-dimethyl-1H-benzotriazole-1-carboxamide (1) or the 2H derivative N,N-dimethyl-2H-benzotriazole-2- carboxamide (2).

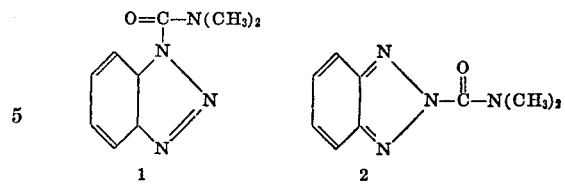

According to publications in the chemical literature, although acylation of benzotriazole with acetyl chloride in pyridine or with ethyl chloroformate in aqueous sodium hydroxide gives only the corresponding 1H derivative, methylation of benzotriazole with methyl iodide in aqueous sodium hydroxide gives a mixture of the 1H and 2H derivatives, in the ratio of 3:2.

The structure 1 has been assigned to the solid compound on the basis of the unsymmetrical nature of the coupling pattern of the aromatic protons in its nmr. spectrum, thus indicating the presence of a spin system other than that involving two sets of identical protons as one would find in 2.

The mother liquors from which the solid product 1 was isolated exhibit essentially the same infrared and nmr. spectra as the initial purified reaction mixture with the exception that the ratio of the broad peak to the sharp peak in the N-methyl region has increased; however, the combined ratio of broad peak and the sharp peak to that of the aromatic multiplet is still 3:2. The elemental analyses remain essentially unchanged and are still quite consistent with a 1:1 combination of dimethylcarbamyl chloride and benzotriazole. The data obtained so far are consistent with the conclusion that the initial reaction product and the mother liquors from which the 1H carboxamide 1 was isolated exist as a mixture of the 1H isomer 1 and the 2H isomer 2.

Thus, the carbonyl absorption at 5.75 $\mu$ in the infrared spectrum of the initial reaction product and the mother liquor is assigned to the carbonyl group in structure 2. Likewise the broad peak in the N-methyl region of the nmr. spectrum of the initial product and mother liquor is assigned to the N-methyl groups in structure 2. The envelope shape of this latter peak is accounted for on the basis of the non-equivalence of the two methyl groups, owing to the partial double-bond character between the nitrogen containing the methyl groups and the carbonyl carbon atom, thus leading to restricted rotation and the observed broadening.

The phenomenon of nonequivalence of the methyl groups (alkyl groups) is common in dimethyl (dialkyl) amides and carbamates. The nmr. spectra of the two-component mixtures at elevated temperature are consistent with this interpretation. In these spectra the broad peak assigned to the methyl groups of the 2H isomer has collapsed to a single sharp peak.

Attempts at the isolation of this second isomer either by column chromatography, thin layer chromatography, fractional distillation, gas chromatography or further fractional crystallization have been unsuccessful.

To exclude the possibility that the use of pyridine as a solvent for the reaction was causing anomalous results and to determine if a higher percentage of the 2H isomer could be obtained, the sodium salt of the acidic (pK 8.2) benzotriazole was prepared and allowed to react with dimethylcarbamyl chloride in dimethoxyethane. The infrared and nmr. spectra of the resulting product were identical to those obtained when pyridine was used as a solvent.

If the reaction of benzotriazole with dimethylcarbamyl chloride is carried out in pyridine at 100°, ca. 18 hrs., one obtains in 65% yield the 1H isomer 1. This result is consistent with the theory that in the presence of base (such as pyridine or sodium hydroxide) benzotriazole is converted to the resonance stabilized anion which bears the negative charge at all three of the ring nitrogens. Then reaction of dimethylcarbamyl chloride with the anion of benzotriazole at the 2-nitrogen gives rise to the kinetically controlled product 2, while reaction at either of the 1-nitrogens give the thermodynamically stable isomer 1.

B. 5,6-dimethylbenzotriazole-dimethylcarbamyl chloride reaction product

The product resulting from reaction of 5,6-dimethylbenzotriazole and dimethylcarbamyl chloride under basic conditions can have the two possible structures represented by 3 and 4.

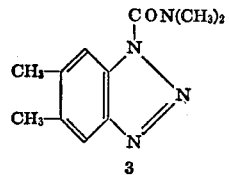   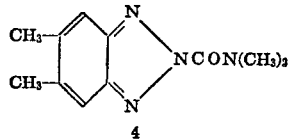

A reaction product was prepared by treating a pyridine solution of 5,6-dimethylbenzotriazole with dimethylcarbamyl chloride followed by dilution with water and recrystallization from 95% ethanol. Its nmr. spectrum shows but three single peak absorptions for the three different types of protons: i.e., the protons of the N,N-dimethyl groups, the protons of the methyl groups attached to the ring and the two aromatic protons.

While one might expect a doublet for the aromatic protons in the spectrum of structure 3, a single peak for these protons is not inconsistent with structure 3. Owing to the fact that acetylation of 5,6-dimethylbenzotriazole is reported to give only the 1H acetate, the structure 3 is considered to be more probable for the product of reaction with dimethylcarbamyl chloride.

The reaction of 5,6-dimethylbenzotriazole with dimethylcarbamyl chloride has been repeated and the crude, unpurified product examined by nmr. spectroscopy. The nmr. spectrum of this material shows two additional peaks: one in the N—CH₃ region and the other in the aromatic region. It is reasonable to assume that these additional peaks are due to the presence of the 2H isomer 4 in addition to the 1H isomer 3. These results demonstrate the variability of distribution of isomers in these reaction products.

C. 5-methylbenzotriazole-dimethylcarbamyl chloride reaction product

In this case, three isomeric benzotriazole carboxamides are possible. These three isomeric possibilities are represented by structures 5, 6 and 7.

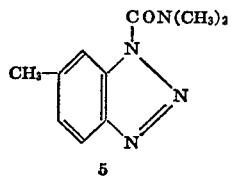   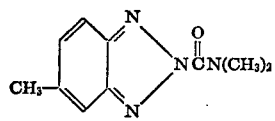

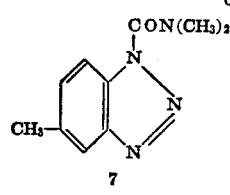

Acetylation of 5-methylbenzotriazole is reported to give only the two isomers 8 and 9 in which acetylation has taken place on the nitrogens adjacent to the aromatic ring (See: Benson, F. R., Hartzel, L. W., and Savell, W. L., J. Am. Chem. Soc., 74. 4918 (1952).

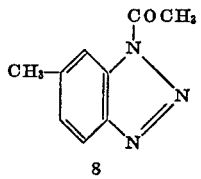   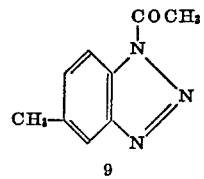

The nmr. spectrum in the N—CH₃ region of the product of reaction of 5-methylbenzotriazole and dimethylcarbamyl chloride has the same characteristic pattern as the spectra of the products obtained from the reactions of 5,6-dimethylbenzotriazole and benzotriazole with dimethylcarbamyl chloride. From these data, it is not unreasonable to conclude that the product is a mixture of all three possible isomers 5, 6 and 7.

D. Procedures

The method of preparation of the reaction products discussed above is illustrated in the procedures which appear below:

Preparation of a mixture of isomeric N,N-dimethyl-1H (2H)-benzotriazole-1(2)-carboxamides Benzotriazole (188.9 g., 1.57 moles) was dissolved in 500 ml. of methanol containing 88.0 g. (1.63 moles) of sodium methoxide. The resulting solution was taken to dryness at reduced pressure on a rotary evaporator. After 4 hrs. at reduced pressure with the flask immersed in a hot water bath at ca. 95°, the salt was removed from the flask and dried in a vacuum oven. The resulting product weighed 226.0 g. and was used without further purification.

To a vigorously stirred suspension of 64.8 g. (0.40 mole) of finely powdered sodio benzotriazole in 500 ml. of benzene was added dropwise 53.4 g. (0.50 mole) of dimethylcarbamyl chloride while keeping the temperature at 25°. The mixture was allowed to stir at room temperature for 17 hrs. Ether (500 ml.) was added and stirring was continued until the insoluble material became granular. The insoluble material was separated by vacuum filtration. The filtrate was washed with three 100-ml. portions of 5% aqueous sodium hydroxide and one portion of saturated brine solution. The organic phase was dried and taken to dryness at reduced pressure giving 73.0 g. (96%) of a mixture of isomers. The infrared spectrum shows a doublet in the carbonyl region at 5.75 and 5.85μ. The percentage of the 2 isomer is determined from the nmr. spectrum in the following manner: The integration for the broad peak in the 3.00–3.22δ region is obtained and divided by the integration for the whole N—CH₃ region (3.00–3.50δ). The numerical figure obtained expressed as a percentage represents the percentage of the 2 isomer (about 20 percent in this case).

Preparation of the reaction product of 5-methylbenzotriazole and dimethylcarbamyl chloride To a stirred solution of 79.8 g. (0.6 mole) of 5-methylbenzotriazole in 200 ml. of pyridine was added dropwise, keeping the temperature below 30°, 75 g. (0.7 mole) of dimethylcarbamyl chloride. The mixture was allowed to stir overnight at room temperature. The reaction mixture was treated with 1000 ml. of diethyl ether and after the solution became transparent, the insoluble material was separated by filtration. The organic filtrate was extracted exhaustively with 5% hydrochloric acid (five 100-ml. portions and four 250-ml. portions) and washed with two 250-ml. portions each of water and saturated brine solution. After drying over MgSO₄ the ether was taken to dryness to give 111.09 (89%) of product. The product may be distilled at reduced pressure and has a B.P. of 128–134° C./0.025 mm.

*Analysis.*—Calculated for C₁₀H₁₂N₄O (percent): C, 58.80; H, 5.92; N, 27.43. Found (percent): C, 59.11; H, 6.12; N, 26.70.

The percentage of the 2 isomer may be estimated from its nmr. spectrum in the same manner as in the case of the reaction product of benzotriazole and dimethylcarbamyl chloride.

Preparation of a mixture of N,N-dimethyl-1H(2H)-5,6-dimethyl-1H(2H)-benzotriazole-1(2)-carboxamides To a stirred solution of 50.4 g. (0.35 mole) of 5,6-dimethylbenzotriazole in 100 ml. of pyridine was added dropwise 43.0 g. (0.40 mole) dimethylcarbamyl chloride, while keeping the temperature at 25±3° C. by cooling in an ice bath. The mixture was allowed to stir at room temperature for 18 hrs. The mixture was poured with stirring into 600 ml. of an ice-water mixture, and the insoluble material separated by vacuum filtration then washed well with water and hexane. After air drying, the crude product weighed 46.8 g. The 2-isomer as estimated from the nmr. spectrum, is present to the extent of approximately 20 percent. This product exhibits a melting range of 73 to 84° C. The material may be purified by recrystallization from ethanol as follows:

A 4.4 g. sample was recrystallized from 50 ml. of 95% ethanol and 50 ml. of water to give 2.8 g. of the pure 1H isomer: M.P. 106–07° C.

Analysis.—Calcd. for $C_{11}H_{14}N_4O$ (percent): C, 60.53; H, 6.47; N, 25.67. Found (percent): C, 60.66; H, 6.08; N, 26.20.

Use of the reaction products to combat insects and mites

The use of the reaction products is illustrated by tests made according to the procedures described below:

Insecticide and miticide testing procedures

Three 5 oz. paper cups containing Henderson dwarf lima bean plants and one 5 oz. paper cup containing Orange Gem nasturtiums, all growing in vermiculite, are placed on a turntable and sprayed to thorough wetness with 25 ml. of a solution of the candidate chemical at the appropriate concentration. The nasturtiums were already infested with 50–100 bean aphids (BA). A bean plant in one paper cup was already infested with 50–100 two-spotted mites (TSM). Leaves from the two remaining bean plants are removed following spraying and placed in disposable petri dishes with 5 southern armyworms (SA) larvae in one petri dish, and 5 Mexican bean beetle (MBB) larvae in the other petri dish. The rating is done approximately 48 hours after spraying as follows:

| BA | TSM[1] |
|---|---|
| E=None dead. | E=No dead adults. |
| D=1–25% dead. | D=1–25% dead adults. |
| C=26–50% dead. | C=26–50% dead adults. |
| B=5; =75% dead. | B=51–75% dead adults. |
| A=76–100% dead. | A=76–100% dead adults. |

| MBB | SA |
|---|---|
| E=0–1 larvae dead. | E=0–1 larvae dead. |
| D=2 larvae dead. | D=2 larvae dead. |
| C=3 larvae dead. | C=3 larvae dead. |
| B=4 larvae dead. | B=4 larvae dead. |
| A=5 larvae dead. | A=5 larvae dead. |

[1] Data reported here for TSM are based on 7 days after spraying.

So as to obtain more meaningful results, all tests were performed at the same time of day, whenever possible, usually in the forenoon. All tests were held under controlled conditions of temperature, light and humidity. Atmospheric pressure was not controlled.

Test results obtained at various concentrations of active chemical are tabulated below. The ratings given are for averages of three or more replicates.

RATINGS OF COMPOUNDS ON MITES AND INSECTS

| | Concentration (p.p.m.) | Mites (TSM) | Southern armyworm (SA) | Mexican bean beetle (MBB) | Bean aphid (BA) |
|---|---|---|---|---|---|
| Benzotriazole reaction products: | | | | | |
| Mixture containing approximately 80% 1H isomer (N,N-dimethyl-1H-benzotriazole-1-carboxamide) and 20% of the 2H isomer. | 250 | | | | A |
| | 125 | | | | B |
| | 62 | | | | C |
| | 31 | | | | E |
| Mixture containing approximately 82% of the 1H isomer and 18% of the 2H isomer (N,N-dimethyl-2H-benzotriazole-2-carboxamide). | 250 | A | E | | A |
| | 125 | E | E | | A |
| | 62 | | | | A |
| | 31 | | | | C |
| | 15 | | | | D |
| Mixture containing approximately 68% of the 1H isomer and 32% of the 2H isomer | 250 | B | | | A |
| | 125 | E | | | A |
| | 62 | E | | | C |
| | 31 | E | | | D |
| | 15 | E | | | E |
| Methylbenzotriazole reaction products: | | | | | |
| Product of reaction of 5,6-dimethylbenzotriazole and dimethylcarbamyl chloride | 250 | | | A | A |
| | 125 | | | A | A |
| | 62 | | | D | B |
| | 31 | | | E | D |
| | 15 | | | E | D |
| Product of reaction of 5-methylbenzotriazole with dimethylcarbamyl chloride | 250 | D | | C | A |
| | 125 | D | | E | A |
| | 62 | E | | E | C |
| | 31 | E | | E | E |
| 95% Malathion | 250 | | | | A |
| | 125 | | | | B |
| | 62 | | | | C |
| | 31 | | | | D |
| | 15 | | | | E |

The tabulated data clearly show effectiveness of the reaction products in combating aphids and lesser effectiveness on other species. The effectiveness of the reaction products is also shown to be comparable to that of a commercial insecticide which is also used to combat aphids.

I claim:
1. A method of combating aphids comprising applying to plants infested with aphids an effective aphicidal amount of a composition consisting of a mixture containing 62 to 82 percent N,N-dimethyl-1H-benzotriazole-1-carboxamide and 32 to 18 percent N,N-dimethyl-2H-benzotriazole-2-carboxamide.
2. The method of claim 1 wherein the mixture is applied at a concentration of at least 62 parts per million.

References Cited

UNITED STATES PATENTS 2,806,035  9/1957  Margot et al. _____ 424—269
3,280,138  10/1966  Molnar et al. _____ 260—308 B VINCENT D. TURNER, Primary Examiner U.S. Cl. X.R.

260—308 B